May 7, 1968     D. P. DIXON     3,381,493
AUTOMOBILE AIR CONDITIONING SYSTEM
Filed Feb. 9, 1967     4 Sheets-Sheet 1
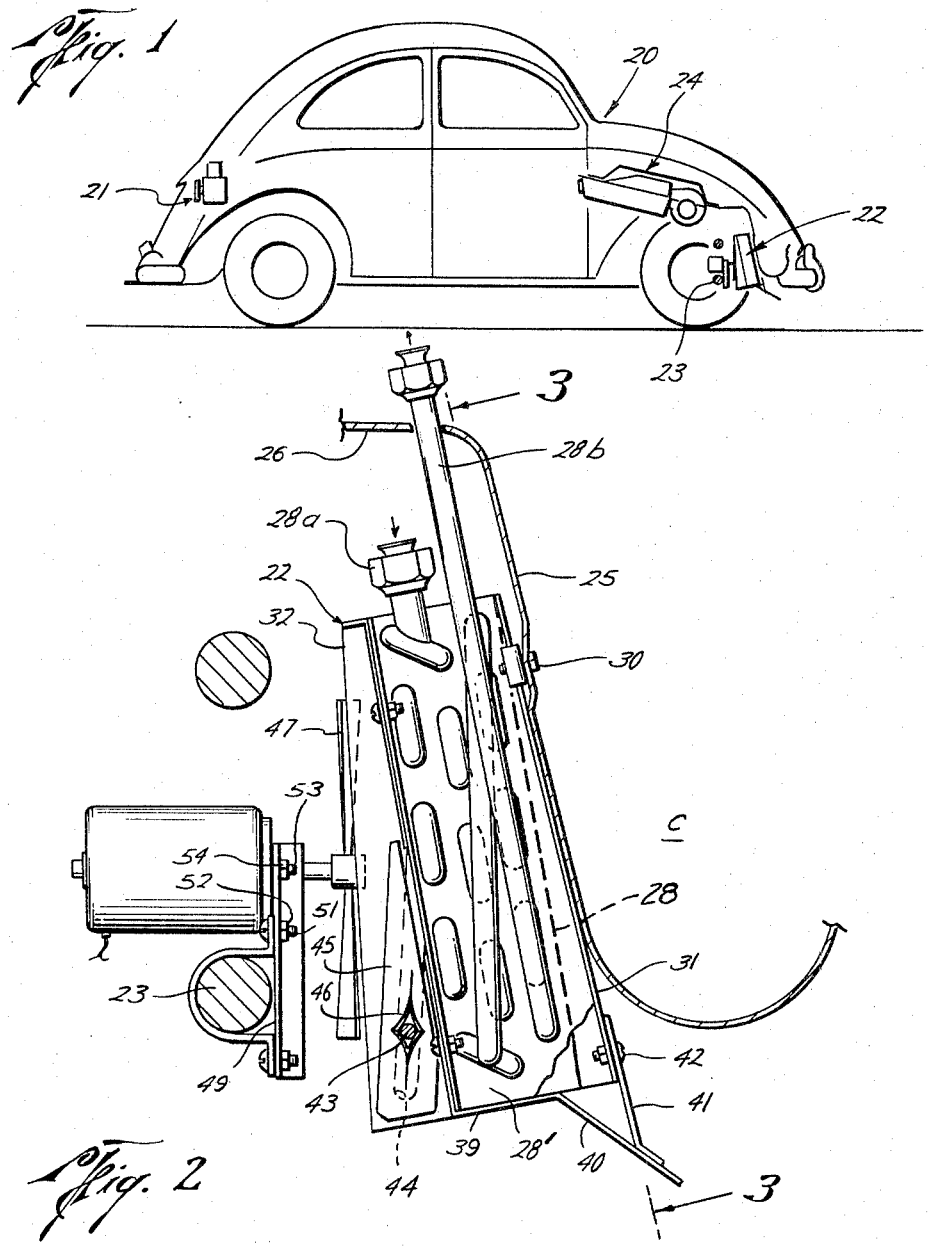
Don P. Dixon
INVENTOR.
BY
Browning, Simms, Hyer
& Eickenroht
ATTORNEYS May 7, 1968  D. P. DIXON  3,381,493
AUTOMOBILE AIR CONDITIONING SYSTEM
Filed Feb. 9, 1967  4 Sheets-Sheet 2

Don P. Dixon
INVENTOR.

BY Browning, Simms, Hyer & Eickenroht
ATTORNEYS

May 7, 1968   D. P. DIXON   3,381,493
AUTOMOBILE AIR CONDITIONING SYSTEM
Filed Feb. 9, 1967   4 Sheets-Sheet 3

Don P. Dixon
INVENTOR.

BY Browning, Simon, Ayes
& Eickenroht
ATTORNEYS

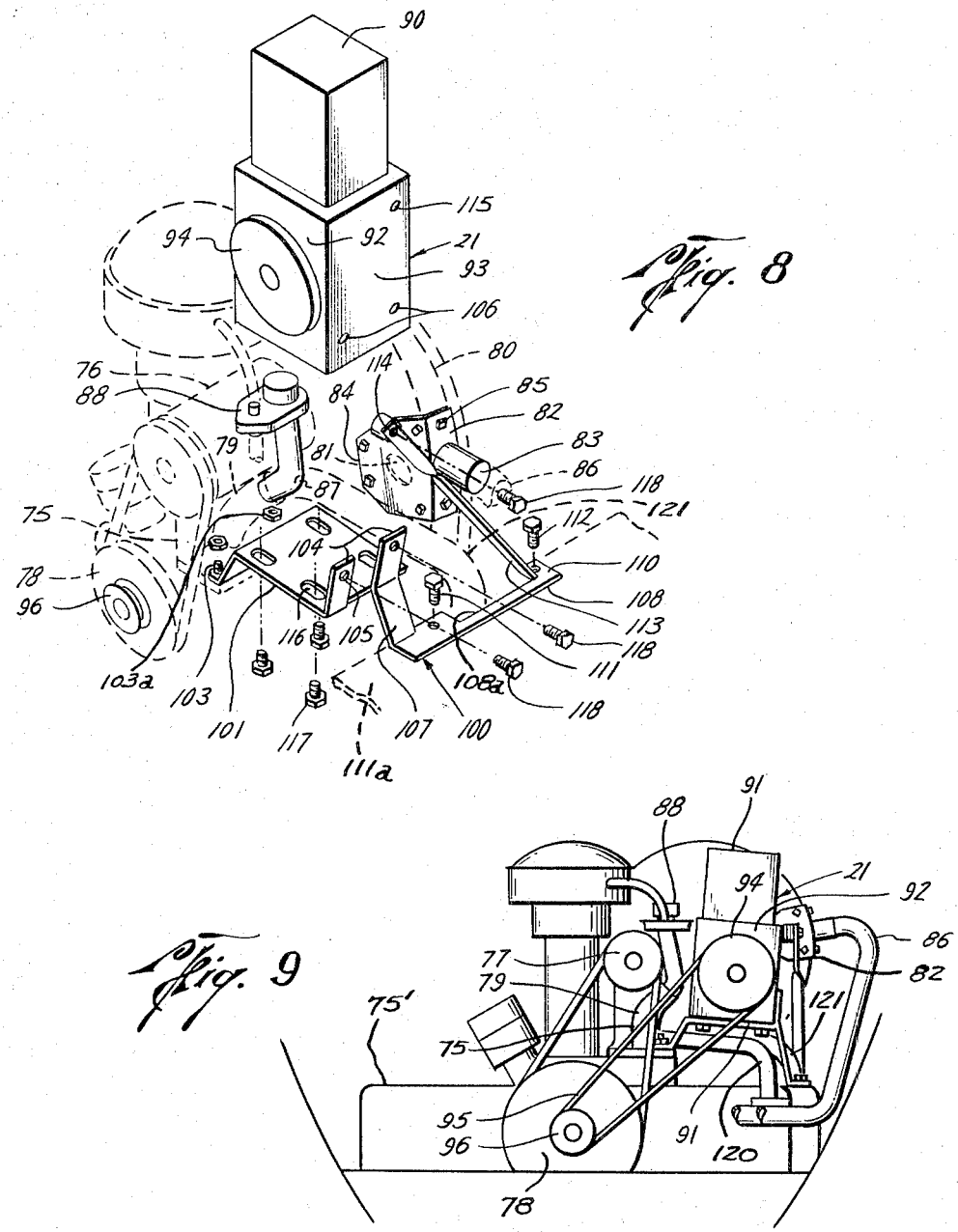

United States Patent Office 3,381,493
Patented May 7, 1968

3,381,493
AUTOMOBILE AIR CONDITIONING SYSTEM
Don P. Dixon, 2011 Sable Lane,
San Antonio, Tex. 78209
Filed Feb. 9, 1967, Ser. No. 614,862
8 Claims. (Cl. 62—244)

ABSTRACT OF THE DISCLOSURE

An air conditioning system for a "1300" series or "bug" Volkswagen automobile, including a condenser assembly mounted between a spare tire compartment and the lower front axle of the automoble, an evaporator having a case with blowers at one end fitting relatively closely within an opening cut through a substantially horizontal wall extending forwardly from the dashboard to separate the luggage compartment in the front end of the automobile from its passenger space, and a compressor supported on a bracket secured by existing parts to the engine block of the motor in a rear compartment of the automobile.

---

This invention relates to an air conditioning system for an automobile; and, more particularly, an improved system which is especially well suited for the "1300" series or "bug" Volkswagen automobile.

Conventional air conditioning systems are not suited to the compact construction of the Volkswagen automobile. That is, there is a very basic problem in finding room for the components of the system, at least without a major modification of the construction of the Volkswagen and/or the use of specially designed parts. This particularly true of the compressor for the system which, as a practical matter, must be located adjacent the power take-off on the crankshaft of the rear mounted motor of the automobile, where space is especially critical.

Because of the space problem, as well as a desire to avoid overheating the engine of this type of automobile, it has been proposed to locate the condenser assembly of the air conditioning system at the front end of the automobile, and particularly adjacent the undercarriage in a position to be cooled by outside air. The design and installation of the assembly in this general area is nevertheless a problem, not only because of the limited space but also because of its inaccessability.

There is the further problem, in the installation of an air conditioning system for an automobile of this type, in mounting the evaporator in such a way that it will supply cool air to the passenger space within the automobile, without unduly cramping leg space beneath the dashboard or creating a safety problem. This is particularly acute in the case of the "bug" Volkswagen automobile in which leg space is already at a premium.

An object of this invention is to provide the "1300" series or "bug" Volkswagen with an air conditioning system which is compact, employs standard parts, and requires no major reconstruction of the automobile.

A more particular object is to arrange the compressor and motor parts within the rear compartment of this type of automobile in such a manner as to keep them within the normal confines of the compartment and, at the same time, enable them to be so arranged with a minimum of time and expense.

A further object is to mount the condenser assembly in such a manner as to avoid any modification of the existing parts of the automobile, other than the attachment thereto of a few brackets, and to simplify its installation and repair.

A still further object is to provide a condenser assembly which is of compact and inexpensive construction and which is especially well adapted for the foregoing objects.

Yet another object is to mount an evaporator in such a way as to provide cool air outlets and controls in the usual places beneath the dashboard in the front of the passenger space of the automobile, but without unduly limiting the leg space beneath the dashboard.

In the drawings, where like reference characters have been used throughout to designate like parts:

FIG. 1 is a side view of a "1300" series or "bug" Volkswagen automobile, with the condenser assembly, the evaporator, and the compressor of the air conditioning system superimposed thereon;

FIG. 2 is an end view of the compressor assembly, as seen along a vertical section taken longitudinally of the automobile;

FIG. 8 is a perspective view of the compressor and mounting parts therefor, as well as additional parts installed on the motor for adapting it to receive the compressor and its mounting parts, and with existing motor parts being shown in broken lines; and FIG. 9 is an elevational view of the motor with the compressor mounted thereon, as seen from the rear of the automobile.

Figure 3:
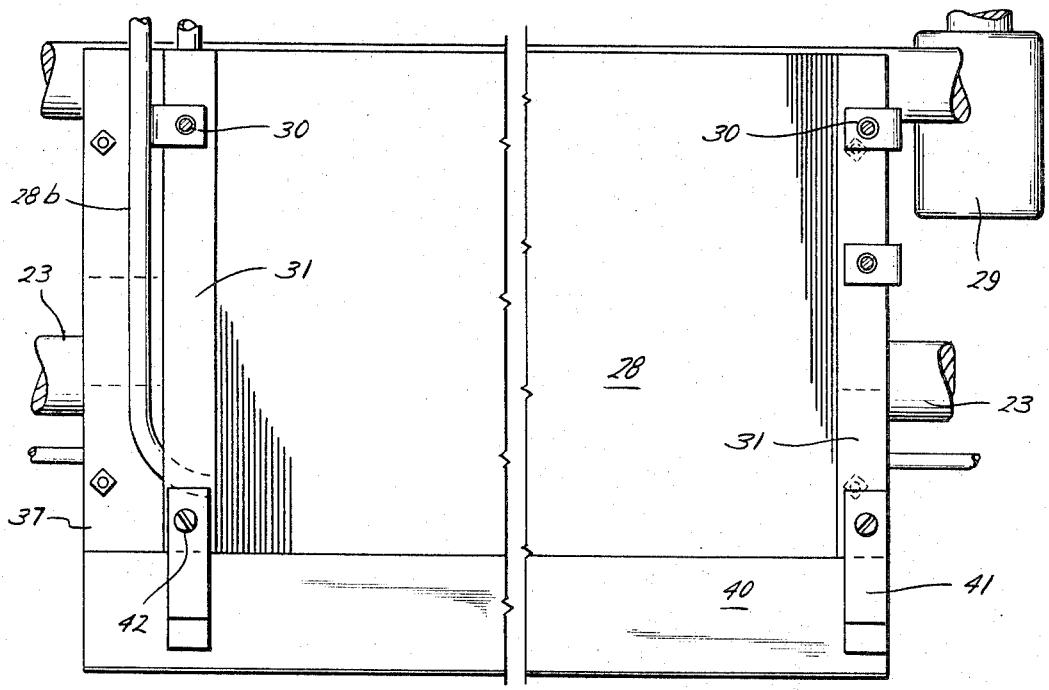
FIG. 3 is a front elevational view of the installed compressor assembly; as seen along broken line 3—3 of FIG. 2.

With reference now to the above-described drawings, and particularly FIG. 1, the "1300" series or "bug" Volkswagen shown therein, and designated in its entirety by reference character 20, has its motor mounted in a compartment at the rear and accessible by means of a door which has been opened in FIG. 9 to permit viewing of the motor. A compressor 21 is shown in FIG. 1 in approximately the position it occupies within the motor compartment when installed in acocrdance with the present invention.

As also indicated in FIG. 1, a condenser assembly 22 is mounted in the forward portion of the automobile intermediate the lower axle 23 for the front wheels and a compartment C on such forward end for storing a spare tire (see FIG. 2). The system further includes an evaporator 24 which is mounted paritally within the passenger compartment P beneath the dashboard and partially within storage compartment L separated from the leg room of the passenger compartment by a substantially horizontal wall (see FIGS. 5 and 6).

As well known in the art, these as well as other components of the air conditioning system are connected to one another for circulating a refrigerant therethrough and thereby cooling the interior of the automobile through outlets from the evaporator into the passenger compartment. Of course, power is transmitted from the crankshaft of the motor to the compressor 21, all in a manner to be described hereinafter.

Figure 5:
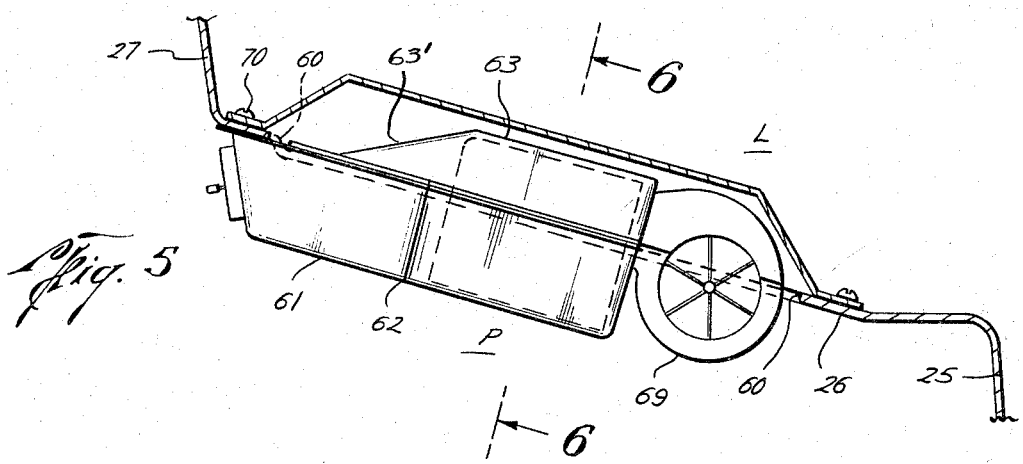
FIG. 5 is an end view of the evaporator, as seen along a vertical section taken longitudinally of the automobile.

As shown in FIG. 2, the spare tire compartment C is formed on the front side of a downwardly and forwardly extending interior wall 25 of the "1300" series Volkswagen. A substantially horizontally extending wall 26 extends rearwardly from the upper end of the wall 25 to separate the leg room in the passenger space P beneath the dashboard from the luggage compartment L thereabove. As shown in FIG. 5, the rear end of the substantially horizontal wall 26 connects with an upwardly extending wall 27 of the dashboard.

Figure 4:
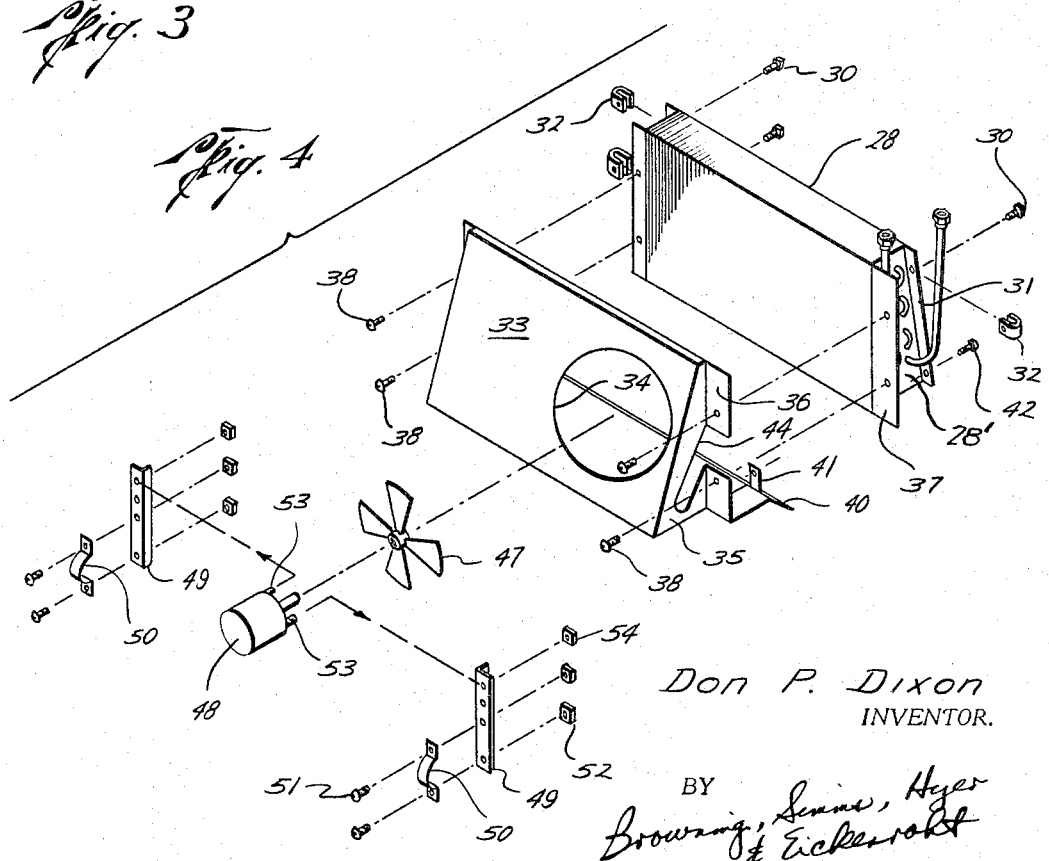
FIG. 4 is an exploded view, in perspective, of the parts of the condenser assembly.

The condenser assembly 22 includes a coil 28 made up of the usual fins and tubes adapted to be mounted on the rear side of the wall 25 for extension laterally of the automobile and parallel to the axle 23. When so mounted, and as shown in FIG. 2, the lower end of such coil is disposed beneath the curved lower end of the wall 25 and the front face thereof is spaced from the wall 25, so that outside air may pass over the tubes through which refrigerant is passed. As shown in FIGS. 2, 3 and 4, this coil is generally rectangular in shape and of standard "slimpack" construction readily available from commercial sources. Also, as shown in FIG. 3, it is mounted on the wall 25 to the right (as viewed from the rear of the automobile) of a steering column mechanism 29 which, of course, extends from the passenger space on the left side of the automobile into the forward portion thereof.

The coil 28 is mounted on the wall 25 by means of a wall 28' secured to each end thereof, and particularly through an outwardly extending flange 31 on the front edge of each wall 28'. As shown in FIG. 2, each such wall 28' is trapezoidal in shape and has its rear edge substantially flush with the back face of coil 28, so that when the flange 31 is against wall 25 there is an upwardly convergent space between the wall and the front face of the coil.

In the assembly of this condenser, the coil 28 is moved upwardly between the back side of the wall 25 and the axle 23 to dispose the flanges 31 on its side walls 28' flush with the back side of the wall 25. The flanges are then connected to such wall by means of screws 30 which extend through holes drilled in the wall 25 for extension through holes drilled in the flanges 31. The ends of the bolts are anchored by C-clips 32 or the like which slip over the outer edge of each flange. More particularly, and as previously noted, the screws are so located as to dispose the lower end of the coil 28 a relatively short distance beneath the lower curved end of the wall 25. This permits air to flow through the coil, but at the same time keeps the lower end of the coil above high center of the automobile. As indicated in FIGS. 3 and 4, there may be two or more C-clips and screws for securing each flange 31 of the coil to the wall 25.

A shroud 32 is mounted on the back side of the coil 28 so as to enclose a space laterally thereacross. This shroud includes a rear wall 33 which tapers downwardly and rearwardly with respect to the open front of the shroud and has an opening 34 disposed toward the right side thereof. Thus, as can be seen from FIGS. 2 and 4, the cross sectional shape of the shroud 32 is substantially triangular with the larger end thereof being at the bottom. Also, the front side of the shroud 32 is coextensive with the rectangular shape of the rear face of the coil 28 so that the space enclosed thereby covers the entire rear side of the coil.

The triangularly shaped side walls 35 of the shroud have flanges 36 therealong for abutment with outwardly extending flanges 37 along the rear edges of the side walls 28' on the coil. Thus, after the coil 28 has been mounted on the rear side of the wall 25, the shroud 32 may be moved upwardly into place behind the coil and connected thereto by screws 38 extending through matched holes in the abutting flanges 36 and 37. When the shroud is so connected to the coil, its top and bottom walls as well as its side walls form continuations of the corresponding walls 28' on the coil 28.

The bottom wall of the shroud has a forward extension 39 which extends beneath the coil 28 and then angularly downwardly as indicated at 40 to form a scoop for directing air flow from beneath the lower end of the wall 25 toward the front face of the coil 28. As best shown in FIGS. 2 and 3, this air scoop 40 extends the full width of the coil. For reinforcement purposes, tabs 41 extend upwardly from the scoop for securement to the lower ends of the flanges 31 on the side walls on coil 28, as by means of screws 42 extending through matched holes in the tab and flanges.

As shown in FIG. 2, however, a laterally extending bar 43, which is for the purpose of reducing sway of the automobile and which is known as a "sway" bar, is disposed just behind the installed coil 28. Thus, in order that the sway bar 43 not interfere with the installation of the shroud 32, the side walls 35 of the shroud are provided with slots 44 which extend downwardly from the front of the shroud toward its lower end. More particularly, the slots intersect the flanges 36 on the front side of the shroud and extend approximately parallel to the rear wall 33 thereof, whereby the shroud may be moved substantially vertically upwardly into position for connection to the back face of the coil 28. The shroud is properly located on the back face of the coil 28 by the abutment of its flanges with the flange 37 and the abutment of its extension 39 with the bottom wall of the coil. This also properly locates the scoop 40 as well as the tabs 41 so that the latter can be connected to the flanges 31 on the front face of the coil 28.

When the shroud has been so connected, a rubber strip 45 or the like is bonded to the sides and end of the slot to cover it except for a slit 46 therein to receive the sway bar 43 therethrough. This, of course, reduces to a minimum the loss of air flowing from the back side of the coil 28 through the shroud 32. Also, and as shown in FIG. 2, outlet 28b from the coil extends through a hole which is drilled in the front end of the wall 26 adjacent its intersection with the wall 25, while the inlet 28a thereto terminates just above the upper end of the coil 28 beneath the wall 26. These are, of course, connected to suitable conduits (not shown) to connect the coil into the rest of the refrigerant system.

A fan 47 is located within the shroud opening 34 so as to draw air through the coil. The ends of the blades of the fan fit rather closely within the opening, and are driven by a motor 48 which is mounted on the lower axle 23. For latter purpose, a pair of angles 49 are mounted in vertical positions on the front side of the axle 23 by means of C-shaped clamps 50 fitting about the axle, and connected to the angles by means of bolts 51 and nuts 52, as best shown in FIG. 2. More particularly the angles are mounted rather closely together so as to receive posts 53 extending from the front side of the motor 48, which enables the motor to be connected to the angles by means of nuts 54 disposable over the threaded ends of the posts, as shown in FIG. 2.

As shown in FIG. 4, there may be a plurality of holes through the upper ends of the angles 49 so as to permit some vertical adjustment of the mounting of the motor 48. Also, of course, the nuts and bolts for the C-shaped clamps 50 may be loosened to permit adjustment of the angles 49 longitudinally along the axle 23 and thus laterally with respect to the automobile.

Figure 6:
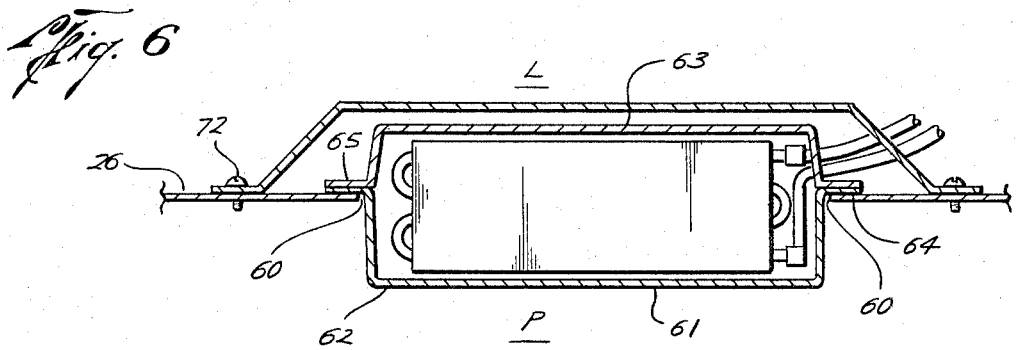
FIG. 6 is a cross-sectional view of the evaporator, as seen along broken line 6—6 of FIG. 5.
Figure 7:
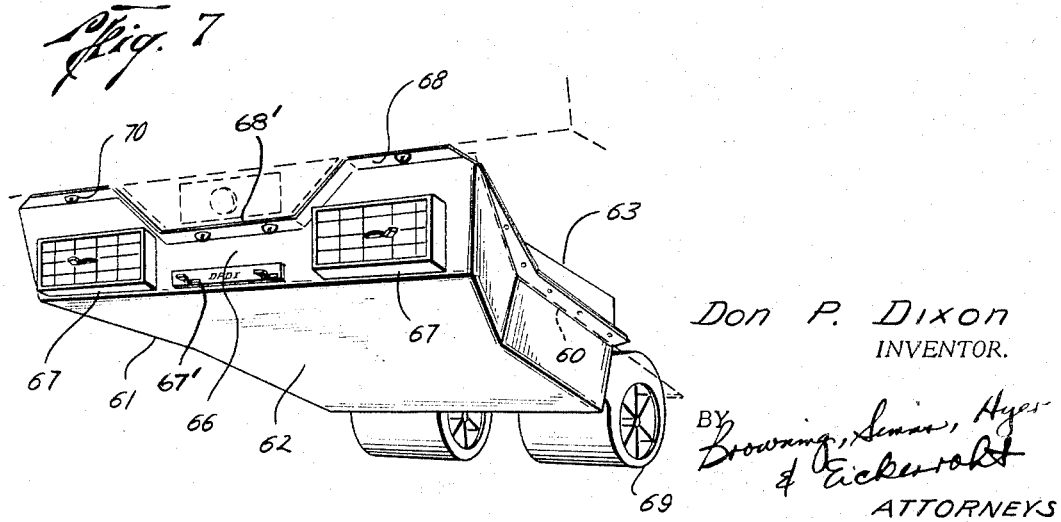
FIG. 7 is a perspective view of the evaporator, with the parts of the automobile on which the evaporator is mounted being shown in broken lines.

As shown in FIGS. 5 to 7, an opening 60 is cut in the wall 26 separating the leg room beneath the dashboard in the passenger space from the luggage compartment L in the forward end of the automobile. A case 61 for the evaporator together with squirrel cage blowers 69 on the end of the case fit rather closely within this opening so as to leave only a minimum space between their outer edges and the inner edges of the opening. Then, upon installation of the case and blowers in a manner to be described, these openings may be closed by a rubber sheet or the like.

The case is made up of a lower section 62 and an upper section 63 which are connected together by means of abutting flanges 64 and 65 on the lower and upper sections, respectively. More particularly, these flanges extend along the opposite sides of the case sections and are connected by bolts or the like extending through matched holes therein, as best indicated in FIG. 7.

The upper section 63 of the case terminates short of the front or face 66 of the lower section 62, as best shown in FIG. 5. More particularly, its front side 63' tapers gradually toward the face and upper side of the lower section 62. Also, there is a flange 68 which projects from the upper edge of the face 66 of the case section 62 and is recessed along an intermediate portion 68' thereof so as to fit the contour of the bottom edge of the dashboard 27, as indicated in broken lines in FIG. 7. Also, air outlet registers 67 and control panels 67' are mounted on the face 66 of the lower case section 62 so as to control and direct cool air flow into the passenger space, as well known in the art.

The case 61 of the evaporator is installed by moving the blowers 69 on its end opposite the face 66 upwardly through the hole 60 from the passenger space side thereof. More particularly, the case is moved through the hole so as to dispose the flanges 64 and 65 on the periphery of the opening 60 on the luggage compartment side of the wall 26. In this way, the case and blowers are supported against downward movement with the upper case section 63 and upper portion of the blowers disposed in the luggage compartment and the lower section 62 and lower blower portions depending into the passenger space beneath the dashboard, or more particularly, beneath the wall 26 extending forwardly from the dashboard.

When the case 61 has been so moved into supported position about the periphery of the opening 60, and with its front face 66 disposed substantially flush with the dashboard 27 as best shown in FIG. 5, the flange 68 along the upper edge of the front face 66 is secured to the wall 26 adjacent the dashboard 27 by means of screws 70 which extend through matched holes in the flange 68 and the wall 26. At this time, the installation may be completed by connection of the tubes extending from the evaporator within the case 61 to suitable portions of the air conditioning system.

However, it is preferred that the upper section 63 of the case 61 first be covered and protected from damage from articles within the luggage compartment L. For this purpose, a dished-out cover 72 is connected over the top case section 63 and secured to the wall 26 by screws 72 or the like, as shown in FIGS. 5 and 6.

Thus, upon completion of the installation, the evaporator has consumed only a small portion of the available space in the luggage compartment as well as in the leg room of the passenger space. That is, neither is cramped by this arrangement, which also permits installation of the evaporator case and blowers with a minimum of preparation. Thus, all that is required is the cutting of the opening 60 and the drilling of holes to accept screws for mounting the case 61 and blowers with the opening.

As shown in FIGS. 8 and 9, the existing motor of the "1300" series or "bug" Volkswagen includes a generator stand 75 having a lower flange 75a mounted on a portion of the engine block 75' from which a power take-off for the crankshaft extends, and a generator 76 mounted on the stand 75 with its pulley 77 above the drive pulley 78 on the take-off. More particularly, in this model of the Volkswagen, there is an inlet 79 for oil which enters the generator stand 75 on its right side.

There is also an air heater housing 80 mounted rearwardly of the generator 76 and having, in the existing construction of this automobile, a hose extending from a hole 81 in its side facing the generator 76. Thus, ordinarily, this hose will extend from the housing 80 across the space in which the compressor 21 is to be mounted in accordance with the present invention. Also, a tube would normally extend axially from the oil inlet 79 into this space. Other existing portions of the motor for which accommodation must be made in mounting the compressor 21, are a heat exchanger tube 120 and an intake manifold 121, both extending laterally of the motor, and with tube 120 rearward of manifold 121.

Thus, in preparing for the installation of the compressor 21, the hose which normally extends from the hole 81 in housing 80 is relocated. For this purpose, a hole is drilled in the narrow right hand side of the housing 80 and an adapter fitting 82 is disposed over this side to dispose a tube 83 extending therefrom in alignment with the new hole. The fitting 82 also includes a side plate 84 which covers the existing hole 81, and is secured to the housing 80 by screws 85. With this fitting on the housing 80, the hose, which formerly extending rearwardly across the space along the side of the generator 76, now extends, when reconnected and as indicated by reference character 86 in FIG. 9, laterally toward the right side of the motor compartment and then rearwardly on the right hand side of the space in which the compressor 21 is to be mounted.

In further preparation for installation of the compressor 21, the right hand edge of the upper end of the oil inlet 79 is severed, and an adapter tube 87 is installed thereon to dispose a filler cap 88 for the inlet to the left side of the space to be occupied by the compressor 21. More particularly, the adapter tube 87 has a lower end which is press-fitted into severed upper end of inlet 79, and is then bent along an intermediate portion to extend substantially in a vertical direction upwardly to its filler cap 88.

In the existing motor for this type of Volkswagen, there are studs 103 extending upwardly from the engine block and through holes in the flange 75' of the generator stand 75 to receive hex heads 103a, which thereby secure the stand to the block. There are also existing tapped holes on the upper side of the block to the right of and below the level of the generator stand, and thus generally above the horizontally disposed cylinders of the motor. These are for the purpose of receiving machine screws for securing a cooling shroud 111a over the cylinders. As will be described to follow, use is made of these existing parts in mounting the compressor 21, thereby further facilitating its installation.

As best shown in FIG. 8, the compressor has a top 90, a bottom 91, a rearwardly facing side 92, and an end 93 which faces the right hand side of the motor compartment when the compressor has been installed. As shown, a clutch pulley 94 of relatively large diameter is mounted on the rear side 92 of the compressor, so that it may be connected to the crankshaft by a belt 95 and a pulley 96 installed on the outer end of the existing pulley 78.

The compressor 21 is mounted on the motor by means of a bracket 100 adapted to be secured to the motor by means of the previously described existing parts. This bracket includes a plate 101 having a top surface upon which the bottom 91 of the compressor 21 rests, and a downwardly and outwardly extending flange 102 on its left end. As shown in FIGS. 8 and 9, the plate 101 is disposed behind manifold 121 and over and generally parallel to the tube 120, and at a small angle to the horizontal. The outward extension of this flange extends at this same angle to the plate 101 so as to be horizontal for resting on the right hand side of flange 75' on the stand 75, and has holes therein adapted to receive the upper ends of existing studs 103 which secure the generator stand 75 to the engine block. Thus, the hex heads 103a are first removed to permit the flange 102 to be placed and then replaced to secured such flange above the flange 75'.

Ears 104 extend upwardly from the opposite end of the plate 101 and at right angles thereto for disposal adjacent the right end 93 of the compressor 21 when it is supported upon the slightly canted top surface of the plate 101. There are holes 105 through the ears 104 adapted to be aligned with holes 106 in the end face 93 of the compressor for a purpose to be described.

A first arm 107 depends downwardly and outwardly from the lower end of front ear 103 to a second arm 108 which extends laterally and forwardly with respect to the first arm 107 and at the previously mentioned small angle to the plate 101 so as to be parallel to flange 102 and thus in a horizontal plane. The second arm has holes 109 and 110 therein for alignment with the existing holes in the shroud 111a and the portion of the engine block above the cylinders when flange 102 of the bracket is secured as previously described. This arm 108 is then secured to the block above the shroud by means of machine screws 111 and 112 slightly longer than those used in the existing motor. A recess 108a in the left side of the arm 108 accommodates the manifold 121, as indicated in FIG. 8. A third arm 113 extends upwardly and rearwardly from the forward end of the second arm 108 and has a hole 114 in its upper end adapted to be disposed in alignment with a hole 115 in the right end face 93 of the compressor.

With the bracket 100 secured to the motor, the compressor 21 may be moved into supporting position on the bracket. When so moved, the bottom 91 of the compressor rests upon the top side of the plate 101 and its right end 93 adjacent the ears 104. More particularly, and as shown in FIG. 8, there are aligned slots 116 in the plate extending laterally of the motor compartment with which holes (not shown) on the bottom of the compressor are adapted to be aligned when the compressor is so supported. At the same time, the holes 106 in the right end of the compressor are aligned with the holes 105 in the ears 104 and the hole 115 on the same side of the compressor is aligned with the hole 114 in the arm 113.

Machine screws 117 are then moved upwardly through the slots 116 for securement to the holes in the bottom of the compressor so as to secure it to the top surface of the plate 101. Then, draw bolts 118 are extended through the holes 105 and 114 for securement to the holes 106 and 115 to permit the compressor as a whole to be drawn toward or moved away from the ears 104. This lateral adjustment of the compressor, which permits adjustment of the tension in the belt 95, is of course made possible by means of the slots 116 through which the studs 117 extend.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a Volkeswagen automobile having a compartment forward of the lower front axle for storing a spare tire; the improvement comprising an air conditioning system having a condenser assembly mounted between the compartment and the lower front axle of the automobile, said assembly including a coil mounted on the rear wall of the compartment and having a front face spaced from and extending laterally across the wall, a shroud having back, side and bottom walls mounted on the back face of the coil to provide an enclosed space laterally thereacross, said back wall having an opening therein, an air scoop integrally connected to the bottom wall of the shroud to face forwardly along the bottom of the coil beneath the lower end of said compartment, a fan rotatable in the shroud opening, and a motor mounted on the lower front axle to support said fan in said opening.

2. In a Volkeswagen automobile of the character defined in claim 1, wherein a sway bar for the automobile extends laterally through relatively confined openings in the opposite side walls of the shroud.

3. A condenser assembly for an air conditioner adapted to be mounted between the lower axle for the front wheels and a tire storage compartment in the forward end of a Volkeswagen automobile; comprising a coil, having a wall on each side, the front edge of each side wall extending beyond the front face of the coil and having an outwardly extending flange thereon adapted to be secured to the rear side of the compartment so as to provide a space on the front face of the coil, a shroud having side walls integraly connected to a bottom wall and a rear wall, flanges extending outwardly from the rear edges of the side walls of the coil and from the front edges of the side walls of the shroud for attaching the open front face of the shroud to the rear face of the coil so as to provide an enclosed space laterally thereacross, the rear wall of said shroud having an opening therein, a fan having a motor for operating it, and means including a bracket for mounting the motor on the lower axle with the fan within the shroud opening.

4. A condenser assembly of the character defined in claim 3, wherein each opposite side wall of the shroud has an upwardly opening slot therein to receive a sway bar during attachment of the shroud to the mounted coil.

5. In a Volkeswagen automobile having a luggage compartment in its front end which is separated from the passenger space by a substantially horizontal wall which extends forwardly from the lower edge of the dashboard; the improvement comprising an air conditioner having an evaporator having a case with blowers at one end fitting relatively closely within an opening through the wall, said case having top and bottom sections with opposed flanges along their side edges and means connecting the flanges together, said flanges being supported on the upper side of said wall along the side peripheries of said opening so that the top section of the case and the portion of the blowers project into the luggage compartment and the bottom section of the case and bottom portion of the blowers depend into the passenger space, the front end of said top case section terminating short of the front end of said bottom section, said bottom case section having a flange along the upper edge of its front end, and means connecting said last-mentioned flange to the bottom side of the wall adjacent the end periphery of said opening toward said dashboard, so as to dispose air outlets on the front end of said bottom case section beneath and substantially flush with the dashboard.

6. In a Volkswagen automobile in which the motor is mounted in a rear compartment having left and right hand sides when facing in a forward direction, said motor including a generator mounted on a stand secured to a portion of the engine block through which the crankshaft extends, an oil inlet entering the stand on the right side of the generator, an air heater housing forward of the generator, and a heat exchanger tube extending laterally parallel to and rearwardly of an intake manifold, the improvement comprising an air conditioning system having a compressor mounted on the motor to the right of the generator and above the heat exchanger tube rearwardly of the intake manifold, a fitting on the heater housing having a tube extending from the right end thereof, a hose connecting with the tube and bending about the right side of the compressor to extend in a rearward direction, an adapter tube having one end connected to the oil inlet and bending upwardly along an intermediate portion to a filler cap on its other end, and a belt connecting the crankshaft to the compressor for driving same.

7. In a Volkeswagen automobile of the character defined in claim 6, wherein the compressor is supported on a bracket having means securing it to existing parts securing the generator stand and a cylinder shroud to different portions of the engine block.

8. For use in an air conditioned Volkeswagen automobile having a motor mounted in a rear compartment, a compressor having a top, a bottom, opposite ends, opposite sides, and a pulley on one of said sides, a bracket including a flat plate having parallel slots therethrough in a direction parallel to the sides of the plate and an upper surface to support the bottom of the compressor, a flange extending downwardly and outwardly from one end of the plate and having holes in its outward extension to receive parts for mounting it to one portion of the motor, ears projecting upwardly from the other end of the plate each having a hole thereon, an extension from the plate including a first arm extending downwardly from one of the ears, a second arm having one end extending laterally from the lower end of the first arm and having holes therein toward its opposite ends to receive parts for mounting it to another portion of the motor, said second arm being recessed along one side edge intermediate the holes therein, and a third arm extending angularly upwardly from the free end of the second arm and toward said first arm, said third arm having a hole in its free end, means on the bottom of the compressor to receive parts extending through the slots in the mounting plate, and additional means on one end of the compressor to receive parts through said ears and the free end of said third arm, said outward extension of the flange and said second arm lying in parallel planes which are disposed at a small angle with respect to the plane of the flat plate.

References Cited

UNITED STATES PATENTS

| | | | |
|---|---|---|---|
| 2,319,002 | 5/1943 | Kramer | 165—42 |
| 2,989,854 | 6/1961 | Goud | 62—244 |
| 3,091,943 | 6/1963 | Plegat | 62—243 |
| 3,096,938 | 7/1963 | Cole | 62—244 X |

WILLIAM J. WYE, *Primary Examiner.*